United States Patent
Agner et al.

(10) Patent No.: US 8,337,171 B2
(45) Date of Patent: Dec. 25, 2012

(54) PUMP DRIVE SYSTEM

(75) Inventors: Ivo Agner, Buehl (DE); Dierk Reitz, Baden-Baden (DE); Reinhard Berger, Buehl (DE); Johannes Lamers, Sasbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 1386 days.

(21) Appl. No.: 11/974,256

(22) Filed: Oct. 12, 2007

(65) Prior Publication Data

US 2008/0087487 A1    Apr. 17, 2008

(30) Foreign Application Priority Data

Oct. 16, 2006 (DE) .................. 10 2006 048 807

(51) Int. Cl.
*F01D 15/02* (2006.01)
*F16D 41/00* (2006.01)
(52) U.S. Cl. ................... 417/319; 192/48.92
(58) Field of Classification Search .......... 417/213, 417/316, 223, 318, 319; 192/48.4, 48.92
See application file for complete search history.

(56) References Cited

U.S. PATENT DOCUMENTS

| 5,474,428 | A | 12/1995 | Kimura et al. |
| 5,799,744 | A | 9/1998 | Yamaguchi et al. |
| 5,823,282 | A | 10/1998 | Yamaguchi |
| 5,993,169 | A * | 11/1999 | Adachi et al. ............... 417/223 |
| 7,287,634 | B2 * | 10/2007 | Agner et al. ............ 192/48.603 |
| 2004/0112654 | A1 | 6/2004 | Kozarekar et al. |
| 2005/0139442 | A1 * | 6/2005 | Agner et al. ............... 192/48.8 |
| 2006/0120896 | A1 * | 6/2006 | Morita et al. .............. 417/410.5 |

FOREIGN PATENT DOCUMENTS

| EP | 1216871 | 6/2002 |
| JP | 2000335263 | 12/2000 |
| JP | 2003336725 | 11/2003 |
| JP | 2005030517 | 2/2005 |
| WO | 2006114542 | 11/2006 |

* cited by examiner

*Primary Examiner* — Devon Kramer
*Assistant Examiner* — Philip Stimpert
(74) *Attorney, Agent, or Firm* — Simpson & Simpson, PLLC

(57) ABSTRACT

A pump drive system having a pump drive element that is driven by a first or a second drive mechanism. The pump drive element is connectable or connected by a coupling element in a rotationally fixed connection either through a first free-wheel device to the first drive mechanism or through a second free-wheel device to the second drive mechanism.

9 Claims, 2 Drawing Sheets

PUMP DRIVE SYSTEM

CROSS REFERENCE TO RELATED APPLICATIONS

This patent claims priority of German Patent Application No. 10 2006 048 807.5, filed Oct. 16, 2006, which application is incorporated herein by reference.

BACKGROUND OF THE INVENTION

The invention relates to a pump drive system having a pump drive element that is driven by a first or a second drive mechanism. In addition, the invention relates to a hybrid vehicle power train having an electric motor, a combustion engine and a transmission, in particular a double-clutch transmission, with at least one transmission input shaft and with a pump drive system as described previously.

SUMMARY OF THE INVENTION

The object of the invention is to create a pump drive system which ensures in a simple manner adequate impulsion of a pump driven by the pump drive system in different operating modes of the two drive mechanisms.

The problem is solved in the case of a pump drive system having a pump drive element that is driven by a first or a second drive mechanism in that the pump drive element is connectable or connected by a coupling element in a rotationally fixed connection either through a first free-wheel device to the first drive mechanism or through a second free-wheel device to the second drive mechanism. The pump drive system according to the invention ensures adequate pump impulsion in various operating modes of the two drive mechanisms, for example in hybrid applications in which an electric machine, in particular an electric motor, is not situated between an internal combustion machine, in particular an internal combustion engine, and a transmission, but rather is coupled to a transmission shaft, including in particular when the internal combustion machine, in particular the internal combustion engine, is shut off and the electric machine, in particular the electric motor, is running.

A preferred exemplary embodiment of the pump drive system is characterized in that the two free-wheel devices act in opposite directions of rotation relative to the coupling element. Preferably, the free-wheel devices are connected so that the faster of the two rotational speeds, i.e., either the rotational speed of the first drive mechanism or the rotational speed of the second drive mechanism always drives a pump driven by the pump drive system.

Another preferred exemplary embodiment of the pump drive system is characterized in that the first free-wheel device is locked when the first drive mechanism is turning faster than the coupling element. The torque of the first drive mechanism is then transmitted through the coupling element to the pump drive element.

Another preferred exemplary embodiment of the pump drive system is characterized in that the second free-wheel device is locked when the second drive mechanism is turning faster than the coupling element. The torque of the second drive mechanism is then transmitted through the coupling element to the pump drive element.

Another preferred exemplary embodiment of the pump drive system is characterized in that the second drive mechanism is connected to a transmission input shaft, in particular a hollow transmission shaft, in a rotationally fixed connection. The first transmission device may be coupled with the transmission input shaft through the first free-wheel device and the coupling element.

Another preferred exemplary embodiment of the pump drive system is characterized in that the transmission shaft is connected in a rotationally fixed connection to a guiding device for a cooling and/or lubricating medium, which is supported so that it can rotate relative to the coupling element. Preferably, through ducts for the cooling and/or lubricating medium are provided in the radial direction between the transmission input shaft and the guide device. The rotatable support is preferably provided by a journal bearing device integrated into the second free-wheel device.

Another preferred exemplary embodiment of the pump drive system is characterized in that the first drive mechanism includes a drive sleeve which is connectable or connected through the first free-wheel device to the coupling element in a rotationally fixed connection. The drive sleeve is preferably constructed as a sheet metal part, and is situated coaxially to the transmission input shaft.

Another preferred exemplary embodiment of the pump drive system is characterized in that the drive sleeve, in particular a journal bearing device, is supported on the coupling element free of transverse forces. That relieves the free-wheel devices of transverse forces.

Another preferred exemplary embodiment of the pump drive system is characterized in that the coupling element is connected to the pump drive element in a rotationally fixed connection. The pump drive element is, for example, a pump drive gear. The coupling element can be connected to the pump drive element, for example, by a tensional connection, in particular a frictional connection.

Another preferred exemplary embodiment of the pump drive system is characterized in that a flow volume produced by a pump driven by the pump drive element is regulated by means of a suction throttle system. The suction throttle system serves to supply the driven pump with cooling and/or lubricating medium as needed.

Another preferred exemplary embodiment of the pump drive system is characterized in that the coupling element includes a coupling sleeve having a first axial section and a second axial section. Preferably, the two axial sections have different diameters.

Another preferred exemplary embodiment of the pump drive system is characterized in that the first axial section works in combination with the first free-wheel device and the second axial section works in combination with the second free-wheel device. Preferably, the two axial sections are connected with each other by a connecting section in a single piece.

In addition, the invention relates to a hybrid vehicle power train having an electric motor, a combustion engine and a transmission, in particular a double-clutch transmission, with at least one transmission input shaft and with a pump drive system as described previously. The pump drive system according to the invention is combinable with any desired transmission types that require a pump, in particular an oil pump. The pump drive system according to the invention is particularly suited for the following applications: Manual-shift transmissions with lubricating oil pump; double-clutch transmissions with crankshaft starter generator or belt-drive starter generator; automatic transmissions with oil supply in towing mode; automatic transmissions; double-clutch transmissions; CVT transmissions; hybrids with hydraulic control and pressure accumulator that ensures the pressure supply when the vehicle is standing still, in order to enable stop-start operation.

BRIEF DESCRIPTION OF THE DRAWINGS

Additional advantages, characteristics and details of the invention are evident from the following description, in which various embodiments are described in detail with reference to the drawing. The figures show the following.

DETAILED DESCRIPTION OF THE INVENTION

Figure 1:
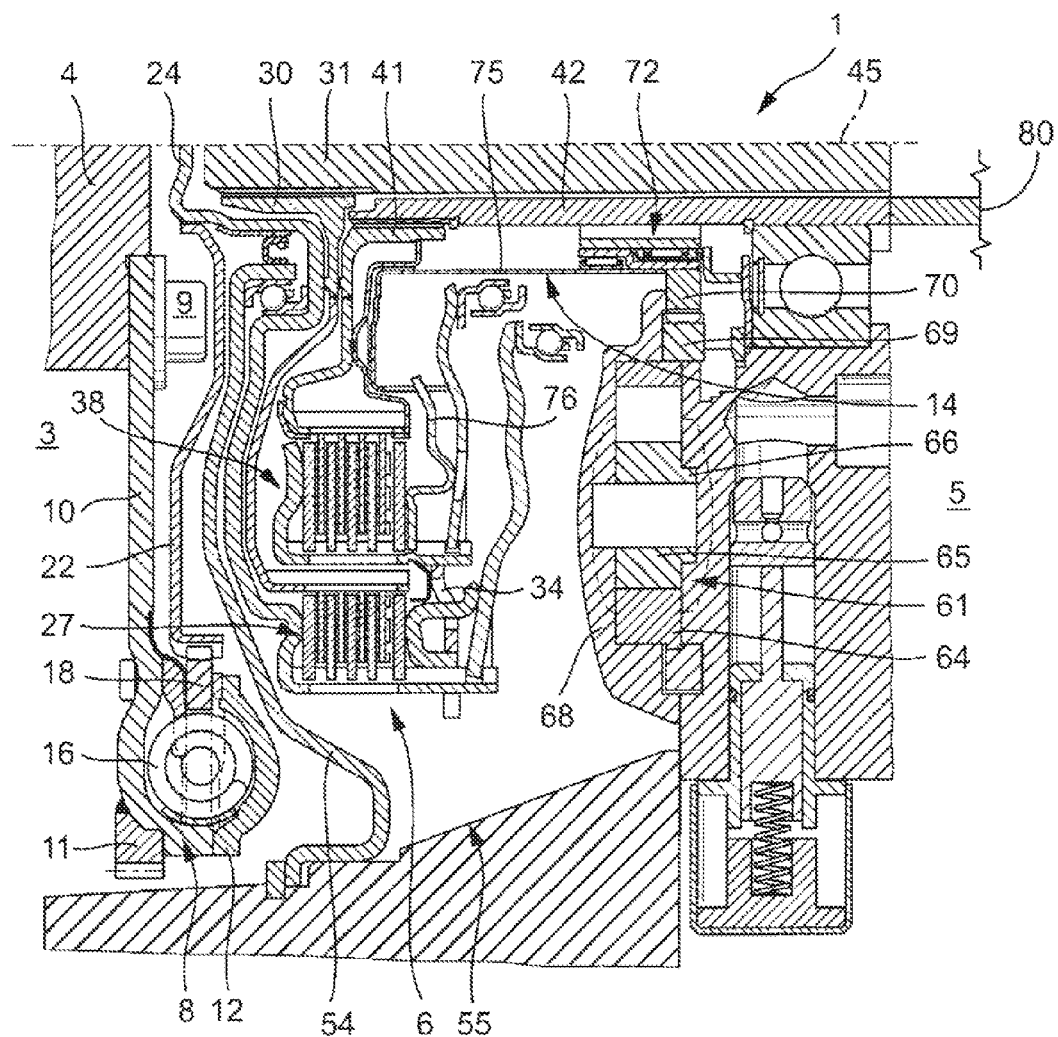
FIG. 1 is the depiction of a half section through a power train having a pump drive system according to the invention.

Part of power train 1 of a motor vehicle is depicted in FIG. 1. Wet operating double clutch 6 of multiple-disk design is situated between drive unit 3, in particular a combustion engine, from which a crankshaft extends, and transmission 5. Rotary vibration damping device 8 is connected between drive unit 3 and double clutch 6. The rotary vibration damping device is a damped flywheel.

Crankshaft 4 of combustion engine 3 is rigidly connected through a screw connection 9 to input part 10 of rotary vibration damping device 8. Input part 10 of rotary vibration damping device 8 has essentially the form of a circular ring disk extending in the radial direction, to which a starter gear rim 11 is welded radially on the outside. In addition, inertial mass 12 is welded onto input part 10 of rotary vibration damping device 8. Inertial mass 12 and input part 10 of rotary vibration damping device 8 form vibration damper cage 14, which at least partially incorporates a plurality of energy storage devices, in particular spring devices 16.

Output part 18 of rotary vibration damping device 8 engages spring devices 16. Output part 18 of rotary vibration damping device 8 is rigidly connected through connecting part 22 to an input part 24 of double clutch 6. Clutch input part 24 is joined in one piece to an outer disk carrier of first multiple-disk clutch arrangement 27. Situated radially inside the outer disk carrier is an inner disk carrier of first multiple-disk clutch arrangement 27. The inner disk carrier is attached radially inside to hub piece 30, which is connected through toothing to first transmission input shaft 31, which is preferably constructed as a solid shaft, in a rotationally fixed connection.

Clutch input part 24, or the outer disk carrier of first multiple-disk clutch arrangement 27, which is connected to the latter in a single piece, is connected through connecting part 34 to an outer disk carrier of second multiple-disk clutch arrangement 38 in a rotationally fixed connection. Situated radially inside the outer disk carrier is an inner disk carrier of second multiple-disk clutch arrangement 38, which is rigidly connected radially on the inside to hub part 41. Hub part 41 is connected through toothing in a rotationally fixed connection to second transmission input shaft 42, which is constructed as a hollow shaft. First transmission input shaft 31 is situated in second transmission input shaft 42 so that it can rotate. The two multiple-disk clutch arrangements 27, 38 have a common axis of rotation 45 and are operated by means of operating levers. Situated between connecting part 22 and the outer disk carrier of first multiple-clutch arrangement 27 is clutch cover 54, which is attached radially on the outside to bell housing 55.

To cool at least one of multiple-disk clutch arrangements 27, 38 a stream of cooling medium is provided by means of pump 61. Pump 61 is attached to a section of the transmission housing in bell housing 55 between a wall of combustion engine 3 and a wall of transmission 5. In the present example, pump 61 is used exclusively for providing the stream of coolant and for lubrication. Pump 61 is an internal gear pump, in particular a gerotor pump. Internal gear pump 61 includes ring gear 64 with internal toothing, with which external toothing of a sun wheel 65 meshes. Sun wheel 65 has central bearing stump 66, and is provided with a central through hole that runs in the axial direction. Bearing stump 66 is supported rotatably in a circular recess in the section of the transmission housing.

Sun wheel 65 is guided by its positioning between two plane-parallel surfaces on the transmission housing section and pump cover 68 that is attached to the transmission housing section. Formed radially on the outside of ring gear 64 is at least one driver lug that engages a complementarily formed recess which is provided radially on the inside on pump gear wheel 69. Pump gear wheel 69 is engaged with drive element 70 which, just like pump gear wheel 69, is provided with helical teeth. Drive element 70 is also referred to as pump drive element or pump drive gear wheel 70. The drive gear wheel or pump drive element 70 is driven through coupling device 72.

Figure 2:
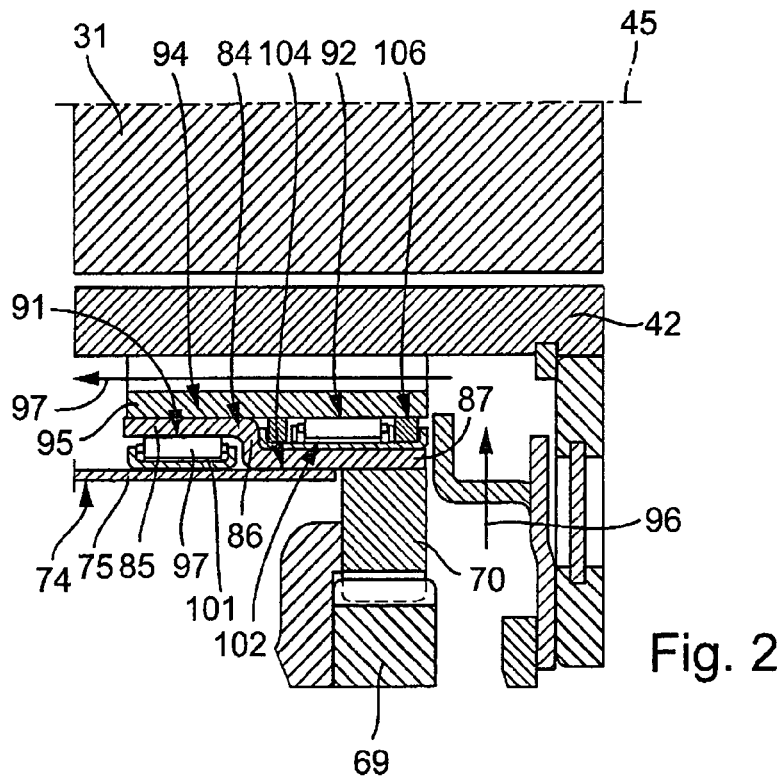
FIG. 2 is an enlarged depiction of the pump drive system from FIG. 1.

In FIG. 2 the pump drive system with coupling device 72 from FIG. 1 is depicted in an enlarged view. In the present example pump 61, which is also referred to as a hydraulic pump, has the function of a pure cooling oil pump. It is also possible, however, for pump 61 to serve as a pressure supply unit of a hydraulic control of the transmission.

In hybrid applications, in which the electric machine, in particular the electric motor, is not situated between the internal combustion machine, in particular the internal combustion engine, and the transmission, but rather is coupled to one of the transmission input shafts, driving of the pump is not ensured when the combustion engine is shut off and the electric motor is running. In FIG. 2, electric motor 80 is coupled to transmission input shaft 42. In the present example, to drive pump 61 first drive mechanism 74 is provided, which includes drive sleeve 75 which is connected to clutch input part 24 through connecting part 76 and connecting part 34 in a rotationally fixed connection, as can be seen in FIG. 1, and is thus driven at the speed of the engine. Drive sleeve or pump drive sleeve 75 is rigidly connected to pump drive element 70 through coupling element 84.

Coupling element 84 includes first axial section 85, which is connected to second axial section 87 through connecting section 86. First axial section 85 is connectable to drive sleeve 75 in a rotationally fixed connection through first free-wheel device 91. First free-wheel device 91 is situated in an annular space between first axial section 85 of coupling element 84 and drive sleeve 75. Second axial section 87 has a larger diameter than first axial section 85, and is connectable to guide device 94 in a rotationally fixed connection through a second free-wheel device 92. Second free-wheel device 92 is situated in an annular space between guide device 94 and second axial section 87 of coupling element 84. Guide device 94 includes guide sleeve 95. Guide sleeve 95 is connected to hollow shaft 42 in a rotationally fixed connection. Between hollow shaft 42 and guide sleeve 95, through ducts running in the axial direction are formed, which enable the passage of cooling oil from the pump (61 in FIG. 1) to the multiple-disk clutch arrangements (27, 38 in FIG. 1).

Dual free-wheeling between pump drive sleeve 75, hollow shaft 42, which represents the second drive mechanism, and pump drive wheel 70 is enabled in a simple way by coupling element 84. The free-wheel mechanisms are connected in such a way that the faster of the two rotational speeds always drives the pump, i.e., either the rotational speed of pump drive sleeve 75, which is driven at the speed of the engine, or the speed of hollow shaft 42, which is driven by the electric motor. When the electric machine, in particular the electric motor, is connected to solid shaft 31, then to ensure that the pump is driven a gear must be pre-selected which is assigned to hollow shaft 42. When pump drive sleeve 75 turns faster than coupling element 84, then first free-wheel device 91 locks up and transmits the torque of drive sleeve 75 to pump drive element 70 through coupling element 84, whose second axial section 87 is pressed into pump drive element 70. Pump drive element 70 may also be part of pump 61. The free-wheel ramps belonging to free-wheel devices 91, 92 are operative at the locations 101, 102. To relieve free-wheel device 91 of transverse forces, pump drive sleeve 75 is supported by a journal bearing on the second axial section 87 of coupling element 84 at location 104.

When hollow shaft 42 turns faster than pump drive gear wheel 70, then second free-wheel device 92 locks up and hollow shaft 42, with guide device 94 interposed, likewise transmits its torque through coupling element 84 to pump drive gear wheel 70. The radial support of coupling element 84 with respect to guide element 94 is provided for example by journal bearing device 106 which is integrated into second free-wheel device 92 on both sides. When the pump drive system depicted in FIG. 2 is in operation, the particular free-wheel device 91, 92 which is not engaged or locked is surpassed by the rotational speed of coupling element 84. The pump drive system according to the invention ensures that pump 61 is driven by rotating transmission input shaft 42 when the combustion engine is shut off. No oiling of the clutch is needed when a vehicle is standing still, since no relative motion occurs between the input and output sides.

Figure 3:
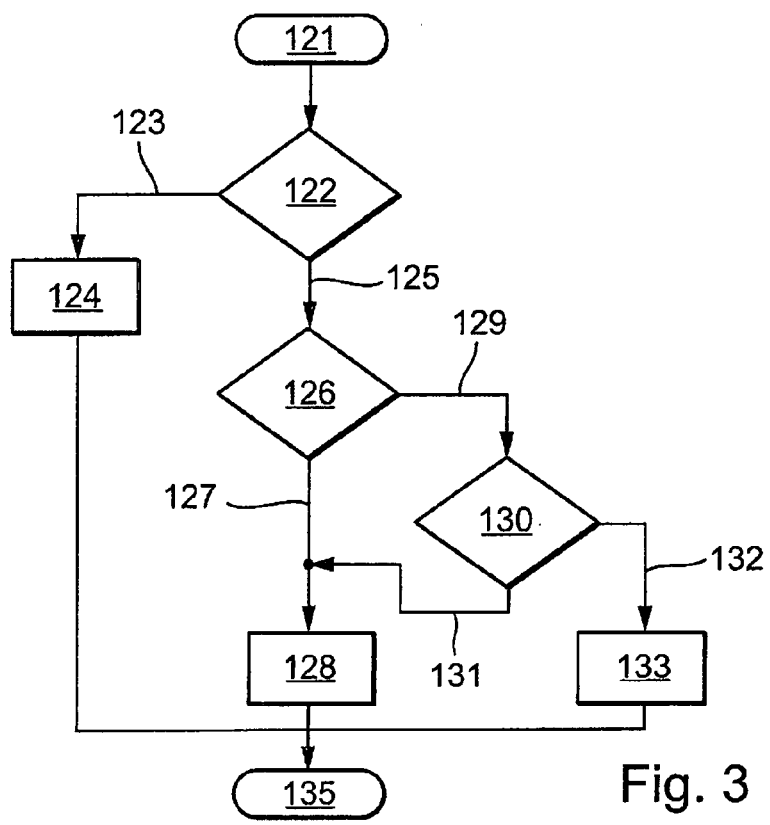
FIG. 3 is a flow diagram for the operation of the pump drive system depicted in FIGS. 1 and 2.

FIG. 3 depicts an operating strategy of the pump drive system according to the invention in the form of a flow chart. After the beginning, which is designated as 121, at a branching 122 a check is performed to determine whether the combustion engine is shut off. If not, then a non-hybrid operating strategy is pursued, as indicated by an arrow 123 and a rectangle 24. If the combustion engine is shut off, then at a branching point 126 a check is performed to determine whether a restart is desired, as indicated by an arrow 125. If a restart is desired, then the maximum volume of cooling oil is provided, as indicated by an arrow 127 and a rectangle 128. If a restart is not desired, then at a branching point 130 a check is performed to determine whether the velocity of the vehicle is lower than a predefined threshold velocity, as indicated by an arrow 129. If the vehicle velocity is lower than the threshold velocity, then the maximum volume of cooling oil is provided, as indicated by an arrow 131 and the rectangle 128. If the vehicle velocity is not lower than the threshold velocity, then a power-dependent volume of cooling oil is provided, as indicated by an arrow 132 and a rectangle 133. The end assigned to the beginning 121 is designated by 135.

In restart situations the actuating of the electric machine, and hence the speed of rotation of the transmission input shaft driving the pump, is not based on the need for cooling oil, but assists exclusively in quick and convenient restarting of the combustion engine and building up the vehicle acceleration. But since a considerable input of power into the clutch can occur in these operating states, it is important to still have a good oiling condition of the clutch at the beginning of the restart. In order to achieve this, it is proposed that the maximum volume of cooling oil be sent to the clutches in deceleration phases below a parameterizable threshold velocity with the combustion engine shut off. The same applies to the duration of the restarting process. That is preferably achieved by a controlled unthrottling on the intake side of the cooling oil pump.

REFERENCE NUMBERS 1 power train
3 drive unit
4 crankshaft
5 transmission
6 double clutch
8 rotary vibration damping device
9 screw connection
10 input part
11 starter ring gear
12 inertial mass
16 spring device
18 output part
22 connecting part
24 clutch input part
27 first multiple-disk clutch arrangement
30 hub part
31 first transmission input shaft
34 connecting part
38 second multiple-disk clutch arrangement
41 hub part
42 second transmission input shaft
45 axis of rotation
54 clutch cover
55 bell housing
61 pump
64 ring wheel
65 sun wheel
66 bearing stump
68 pump cover
69 pump gear wheel
70 pump drive element
72 coupling device
74 first drive mechanism
75 drive sleeve
76 connecting part
84 coupling element
85 first axial section
86 connecting section
87 second axial section
91 first free-wheel device
92 second free-wheel device
94 guide device
95 guide sleeve
96 arrow
97 arrow
101 location
102 location
104 location
106 journal bearing device
121 beginning
122 branching
123 arrow
124 rectangle
125 arrow
126 branching point
127 arrow
128 rectangle
129 arrow
130 branching point
131 arrow
132 arrow 133 rectangle
135 end

What is claimed is:

1. A pump drive system comprising:
a pump drive element rotatingly driving an input for the pump;
a first drive mechanism;
a second drive mechanism;
a coupling element rotationally fixed to the pump drive element and including a first surface facing radially inward and a second surface facing radially outward;
a first free wheel device engaged with the first surface; and,
a second free wheel device engaged with the second surface, wherein:
when the rotational speed of the first drive mechanism is greater than the rotational speed for the second drive mechanism, the first freewheel device rotationally connects the first drive mechanism with the coupling element; and,
when the rotational speed of the second drive mechanism is greater than the rotational speed for the first drive mechanism, the second freewheel device rotationally connects the second drive mechanism with the coupling element.

2. The pump drive system recited in claim 1, wherein a transmission input shaft is connected in a rotationally fixed connection to a guide device for a cooling and/or lubricating medium, and wherein the guide device is rotatable relative to the coupling element.

3. The pump drive system recited in claim 1, wherein the first drive mechanism includes a drive sleeve which is connectable or connected through the first free-wheel device to the coupling element in a rotationally fixable connection.

4. The pump drive system recited in claim 3, wherein the drive sleeve is supported on the coupling element free of transverse forces by a journal bearing device.

5. The pump drive system recited in claim 1, wherein a flow volume produced by a pump driven by the pump drive element is regulated by means of a suction throttle system.

6. The pump drive system recited in claim 1, wherein the coupling element includes a coupling sleeve having a first axial section and a second axial section.

7. The pump drive system recited in claim 6, wherein the first axial section works in combination with the first free-wheel device and the second axial section works in combination with the second free-wheel device.

8. A hybrid vehicle power train, comprising:
an electric motor;
a combustion engine;
a double-clutch transmission, with at least one transmission input shaft; and
a pump drive system comprising:
a pump drive element rotatingly driving an input for the pump;
a first drive mechanism;
a second drive mechanism;
a coupling element rotationally fixed to the pump drive element and including a first surface facing radially inward and a second surface facing radially outward;
a first free wheel device engaged with the first surface; and,
a second free wheel device engaged with the second surface, wherein:
when the rotational speed of the first drive mechanism is greater than the rotational speed for the second drive mechanism, the first freewheel device rotationally connects the first drive mechanism with the coupling element; and,
when the rotational speed of the second drive mechanism is greater than the rotational speed for the first drive mechanism, the second freewheel device rotationally connects the second drive mechanism with the coupling element.

9. A pump drive system comprising:
a pump drive element rotatingly driving an input for a pump;
a first drive mechanism;
a second drive mechanism;
a coupling element rotationally fixed to the pump drive element and including a first surface facing radially inward and a second surface facing radially outward;
a first free wheel device engaged with the first surface; and,
a second free wheel device engaged with the second surface, wherein:
torque rotating the first drive mechanism at a rotational speed is able to rotate the second drive mechanism at the rotational speed;
when the rotational speed for the first drive mechanism is greater than a rotational speed for the second drive mechanism, the first freewheel device rotationally connects the first drive mechanism with the coupling element; and,
when the rotational speed for the second drive mechanism is greater than the rotational speed for the first drive mechanism, the second freewheel device rotationally connects the second drive mechanism with the coupling element.

* * * * *